United States Patent [19]

Takenaka

[11] 4,207,662

[45] Jun. 17, 1980

[54] METHOD OF MANUFACTURING AN ALUMINUM HEAT EXCHANGER

[75] Inventor: Hitoshi Takenaka, Hatano, Japan

[73] Assignee: Nihon Radiator Co., Ltd., Japan

[21] Appl. No.: 809,027

[22] Filed: Jun. 22, 1977

[51] Int. Cl.² .............................................. B23P 15/26
[52] U.S. Cl. ......................... 29/157.3 C; 29/157.3 A; 113/118 B; 113/118 C
[58] Field of Search .................. 29/157.3 C, 157.3 A, 29/157.3 B, 157.3 R; 113/118 B, 118 C

[56] References Cited

U.S. PATENT DOCUMENTS

| | | | |
|---|---|---|---|
| 1,171,899 | 2/1916 | Still | 113/118 B |
| 1,865,051 | 6/1932 | Trane | 29/157.3 A |
| 2,046,791 | 7/1936 | Przyborowski | 113/118 B X |
| 2,368,403 | 1/1945 | Barnes | 29/157.3 A |
| 3,231,017 | 1/1966 | Henderson | 29/157.3 A X |
| 4,041,594 | 8/1977 | Chartet | 29/157.3 C |

FOREIGN PATENT DOCUMENTS 202425  3/1959  Austria .................................. 29/157.3 B

*Primary Examiner*—Daniel C. Crane
*Assistant Examiner*—V. K. Rising
*Attorney, Agent, or Firm*—Gordon W. Hueschen

[57] ABSTRACT

A method of manufacturing an aluminum heat exchanger comprising the steps of: forming inclined surfaces on a support plate including an aluminum core clad with a brazing material layer at least on its top surface, said inclined surfaces sloping downwardly toward an aperture in the support surface; inserting a water pipe having an outer wall made of aluminum into said aperture with said core held in contact with said water pipe; assembling said support plate and said water pipe so that, when heated, said brazing material layer is melted, and flows down toward and collects around said aperture wherein said water pipe contacts said support plate; and heating said support plate and said water pipe to melt the brazing material layer, whereby the parts to be joined can be brazed together.

4 Claims, 11 Drawing Figures

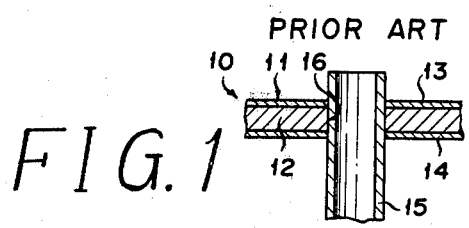
FIG. 1
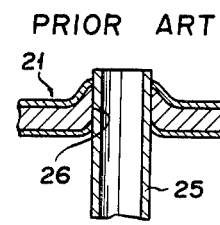
FIG. 2
FIG. 3
FIG. 4
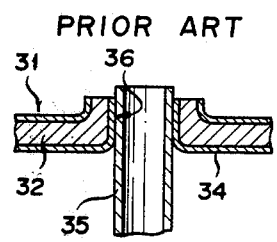
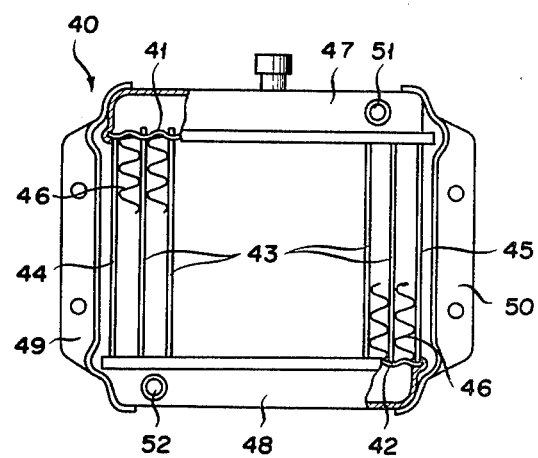
FIG. 5
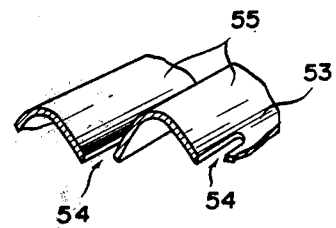
FIG. 6
FIG. 7
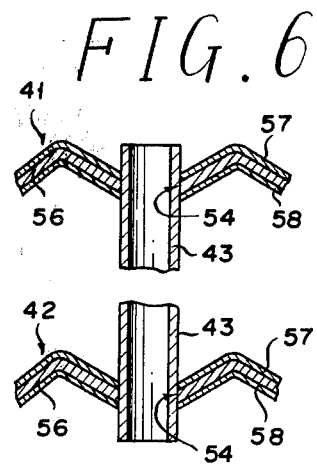
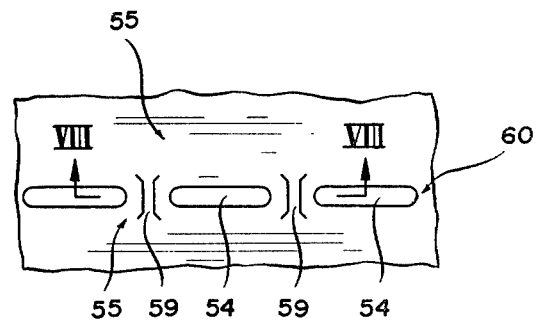

METHOD OF MANUFACTURING AN ALUMINUM HEAT EXCHANGER

BACKGROUND OF THE INVENTION

1. Field of the Invention

The present invention relates to a method of manufacturing an aluminum heat exchanger, and more particularly it relates to a method of manufacturing a heat exchanger made of aluminum and having pipes and their support plates brazed with a high degree of rigidity and fluid-tightness.

2. Prior Art

Recent aluminum heat exchangers for use as radiators on automobiles include brazing sheets comprising an aluminum alloy core clad on one or both sides with an aluminum brazing filler alloy containing silicon, magnesium and similar materials and having a melting point lower than that of the core. The brazing sheets are formed into pipes, support plates and fins which are then assembled and held together by a jig. The assembly is put into a furnace wherein it is heated up to a temperature at which the brazing filler metal is melted, but the core is not melted, whereupon the melted filler metal is distributed into the joints. The assembly is then removed from the furnace and cooled, to thereby provide a brazed heat exchanger. Usually, it is sufficient to use a filler-clad member as one of two parts to be joined.

A problem with prior brazing processes is that melted filler metal may not come to where it should be, with the result that a completed exchanger may suffer from water leakage. For example, FIG. 1 shows a portion of a conventional heat exchanger 10 having a support plate 11 including an aluminum core 12 clad on upper and lower surfaces with a pair of brazing filler layers 13 and 14, respectively, and a non-clad water pipe 15 extending through an aperture 16 in the support plate 11. The filler layer 13, when melted, wets the joint between the support plate 11 and the water pipe 15 by surface tension. However, the melted layer is not sufficient in volume to provide a rigid connection. The melted filler layer 14 is also attracted to the joint on account of surface tension, but is liable to flow down along the outer wall of the water pipe 15.

According to another prior proposal illustrated in FIG. 2, an edge bounding an aperture 26 in a support plate 21 is upturned for facilitating the insertion of a water pipe 25 into the plate 21. With this structure, however, melted filler metal flows away from the joint and cannot provide rigid brazing.

A still another prior attempt is shown in FIG. 3 in which an edge that defines a pipe-receiving aperture 36 is bent uprightly so that a lower filler layer 34 is held in contact with the outer wall of a water pipe 35. When the filler layer 34 is melted, it flows down, leaving a gap between a core 32 of a support plate 31 and the water pipe 35 only by action of surface tension. Water leakage is then apt to occur through the gap.

SUMMARY OF THE INVENTION

An object of the present invention is to provide an improved method of manufacturing an aluminum heat exchanger.

Another object of the present invention is to provide a method of manufacturing an aluminum heat exchanger having components connected firmly together by a large amount of brazing material.

A still further object of the present invention is to provide a method of manufacturing an aluminum heat exchanger which is completely free from water leakage.

According to the present invention, these objects can be attained by a method of manufacturing an aluminum heat exchanger comprising the steps of: forming inclined surfaces on a support plate including an aluminum core clad with a brazing material layer at least on its top surface, said inclined surfaces sloping downwardly toward an aperture in the support surface; inserting a water pipe having an outer wall made of aluminum into said aperture with said core held in contact with said water pipe; assembling said support plate and said water pipe so that, when heated, said brazing material layer is melted, and flows down toward and collects around said aperture wherein said water pipe contacts said support plate; and heating said support plate and said water pipe to melt the brazing material layer, whereby the parts to be joined can be brazed together.

The present invention will be understood best in connection with the accompanying drawings.

BRIEF DESCRIPTION OF THE DRAWINGS

FIGS. 1 through 3 are fragmentary vertical cross-sectional views of the portions of prior heat exchangers in which a filler-clad support plate and a non-clad water pipe are brazed together;

FIG. 4 is a front elevational view, with parts cut away, of a heat exchanger constructed in accordance with the present invention;

FIG. 5 is an enlarged fragmentary perspective view of a support plate of the heat exchanger shown in FIG. 4;

FIG. 6 is an enlarged fragmentary vertical cross-sectional view showing a portion in which a water pipe and the support plates as shown in FIG. 5 are brazed together;

FIG. 7 is a fragmentary plan view of a modified support plate;

DETAILED DESCRIPTION OF THE PREFERRED EMBODIMENTS

Figure 8:
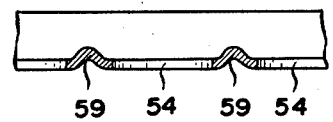
FIG. 8 is a cross-sectional view taken along line VIII—VIII of FIG. 7.

In FIG. 4 an aluminum heat exchanger 40 according to the present invention includes a pair of upper and lower support plates 41 and 42 between and through which a plurality of flattened water pipes 43 extend, a pair of side plates 44 and 45 connecting the support plates 41 and 42 together, a plurality of corrugated fins 46 each interposed between adjacent water pipes 43 and side plates 44 and 45, a pair of upper and lower tanks 47 and 48 mounted on the upper and lower support plates 41 and 42, respectively, and a pair of mounting brackets 49 and 50 jointing the upper and lower tanks 47 and 48 together, these components being brazed firmly. The upper tank 47 has an inlet conduit 51 to which a hose (not shown) can be connected. Likewise, the lower tank 48 has an outlet conduit 52 to which a hose (not shown) can be connected. Hot water is introduced through the inlet conduit 51 into the upper tank 47, and flows down through the pipes 43 while the water is cooled by air passing the spaces between the pipes 43 and the fins 46. The cooled water flows into the lower tank 48 and is discharged therefrom through the outlet conduit 52.

As shown in FIG. 5, each of the upper and lower support plates 41 and 42 is corrugated to provide a plurality of valleys 53 in which there are punched out a plurality of apertures 54 for receiving therethrough the water pipes 43. There are provided a plurality of inclined surfaces 55 sloping downwardly to the apertures 54. In FIG. 6, each support plate comprises an aluminum core 56 clad on its both surfaces with a pair of brazing filler metal layers 57 and 58. The water pipe 43 extends through the apertures 54 in the upper and lower support plates 41 and 42 and has its outer wall held in direct contact with the aluminum cores 56.

When put into a furnace and heated up to a predetermined temperature at which the brazing filler metal layers 57 and 58 are melted, but the cores 56 and other aluminum components are not melted, the upper filler layers 57 of the support plates 41 and 42 become melted and flows down along the inclined surfaces 55 toward the apertures 54 in which the water pipes 43 contact the support plates 41 and 42. Thus, the melted brazing material collects around and wets the joints in the valleys 53, thereby preventing the brazing material from flowing away from the joints.

According to another embodiment illustrated in FIGS. 7 and 8, there are provided a plurality of lands 59 each located between every one of the adjacent apertures 54 in one valley, the land 59 extending transversely of a valley 60 between adjacent inclined surfaces 55. With the lands 59 thus provided, the melted filler material is confined around the apertures 54 through which the pipes 43 extend. The provision of the lands is useful especially where the distance between adjacent apertures is relatively large.

Figure 9:
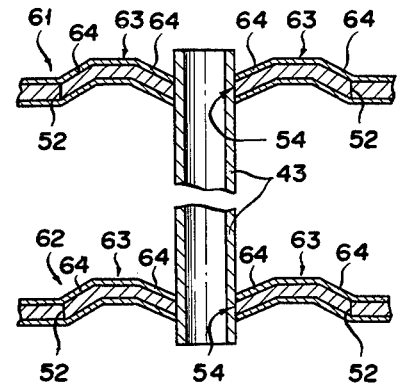
FIG. 9 is an enlarged fragmentary vertical cross-sectional view showing a portion in which a water pipe and support plates of another embodiment are brazed together.

Each of modified support plates 61 and 62 shown in FIG. 9 comprises a plurality of flat portions 63 provided between adjacent apertures 54, there being inclined surfaces 64 which are sloped to the extent that they can hold a sufficient amount of melted filler metal for brazing. The flat portions 63 are advantageous where a distance between laterally adjacent pipes 43 is relatively large, because such arrangement permits the height of the corrugated support plates 61 and 52 to be lowered without sacrificing the angle of incline of the surface 64.

The cores for cladding materials, water pipes, and fins can be made of pure aluminum for industrial use, or rolling aluminum alloy containing copper, manganese, silicon, magnesium, zinc, chromium, and nickel. The filler metal used as a cladding layer over the aluminum core can be a usual brazing material for aluminum. A typical example is an aluminum composition disclosed in Japanese Patent Publication No. 31821/73, the composition containing 3–15% by weight of silicon, 0.4–10% by weight of magnesium, and the balance of aluminum. The cladding rate of the brazing material is generally 5–15% by weight.

Figure 10:
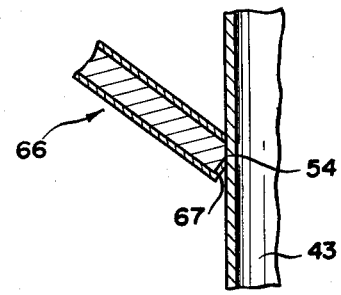
FIG. 10 is an enlarged fragmentary vertical cross-sectional view of a still modified support plate having an aperture-bounding edge cut to facilitate the insertion of a water pipe.

In order to manufacture an aluminum heat exchanger using the cladding material, the water pipes 43 and the fins 46 are first assembled with a jig, and then the upper and lower support plates 41 and 42 are fitted over the ends of the water pipes 43. The lower support plate 42 can be mounted on the pipes 43 relatively easily since the aperture-bounding edges of the plate 42 project away from the pipes 43. However, the upper support plate 41 is relatively difficult to mount because the aperture-bounding edges of the plate 41 project toward the pipes 43. One solution to this difficulty would be to form the apertures 54 so as to have a diameter slightly larger than the outside diameter of the pipe 43 and, upon insertion of the pipe 43, to enlarge the outside diameter of the pipe 43 so that the pipe 43 may fit closely in the aperture 54. Alternative solution is shown in FIG. 10 wherein an aperture-bounding edge of a support plate 66 has a guide surface 67 sloping downwardly and outwardly so that the pipe 43 can be guided smoothly into the aperture 54 at the time of assembly.

The heat exchanger thus assembled is put into a furnace and heated in a non-oxidizing atmosphere up to a predetermined temperature at which the cladding material is melted, but other aluminum components such as the cores, water pipes, and fins remain unmelted. The melted filler flows down toward the pipe-receiving apertures, and collects around and wets the joints between the water pipes and the support plates, to thereby braze them together. The term oxide-reducing atmosphere comprehends both partial vacuum and inert atmosphere such as argon and helium.

The fins and water pipes may be made of the cladding material. When an outer surface of the water pipes which are bonded to the fins are non-cladding material such as A3003, the fins may be the cladding material, and when the water pipes are cladding material, the fins may be the non-cladding material such as A3003P.

As mentioned above, a method of manufacturing an aluminum heat exchanger in accordance with the present invention, upper and lower plates including an aluminum core clad with a brazing filler alloy at least on its top surface is formed with an inclined surface sloping downwardly to an aperture through which extends a water pipe, the water pipe being in contact with the core of the support plates, so when heated to a predetermined temperature, the filler material is melted and flows down along the inclined surface toward the aperture. Therefore, the effects of collecting the brazing material and preventing the flowing out thereof and it is very useful industrially.

EXAMPLE

Figure 11:
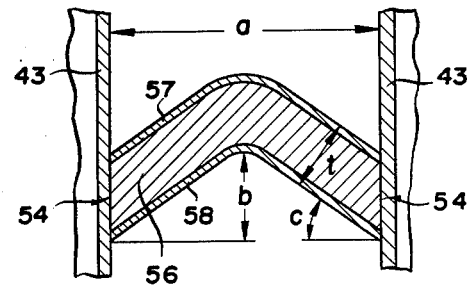
FIG. 11 is an enlarged fragmentary vertical cross-sectional view of water pipes and a support plate, the view being explanatory of the dimensional relationships of the parts.

A core 56 was made of aluminum alloy (A3003) and clad on its both surfaces with 10% by weight of silicon, 2% by weight of magnesium and the balance of aluminum at a cladding rate of 15%. The filler-clad core 56 was formed into the upper and lower support plates 41 and 42 having the corrugated shape as shown in FIGS. 6 and 11. Dimensions of the parts shown in FIG. 11 were selected as follows:
a=7 mm; b=2.5 mm; c=35°; and t=2 mm.

Into the apertures 54 in the support plates 41 and 42 were fitted flattened water pipes 43 made of aluminum alloy A3003. Fins of cladding material were also assembled with a jig. The overall assembly was then placed into a furnace and vacuum-heated under the following conditions:
Initial degree of vacuum: $1.8 \times 10^{-4}$ mmHg
Final degree of vacuum: $2 \times 10^{-3}$ mmHg
Heating time interval: 6 minutes
Heating temperature: 585° C.–595° C.

The brazing of the joints was extremely good. With a heating temperature of less than 580° C. or more than 600° C., the brazing of the joints was poor.

What is claimed is:

1. A method of manufacturing an aluminum heat exchanger comprising the steps of:

forming inclined surfaces on a support plate including an aluminum core clad with a brazing material layer at least on its top surface, said inclined surfaces sloping downwardly toward an aperture in the support surface, said support plate being corrugated to provide a valley with a plurality of said apertures being formed in said valley;

inserting a pipe having an outer wall made of aluminum into each said aperture with said core held in contact with said pipe;

assembling said support plate and said pipes so that, when heated, said brazing material layer is melted, and flows down toward and collects around said aperture wherein said pipe contacts said support plate; and heating said support plate and said pipe to melt the brazing material layer, whereby the parts to be joined can be brazed together.

2. A method according to claim 1, in which said apertures are formed by punching out said valley of said corrugated support plate.

3. A method according to claim 1, further including lands each located between adjacent ones of said apertures, said lands extending transversely of said valley between said inclined surfaces.

4. A method according to claim 1, further including a flat portion provided between adjacent ones of said inclined surfaces of said corrugated support plate.

* * * * *